C. L. Graves' Shank & Toe Laster.
No. 118,527.
Patented Aug. 29, 1871.
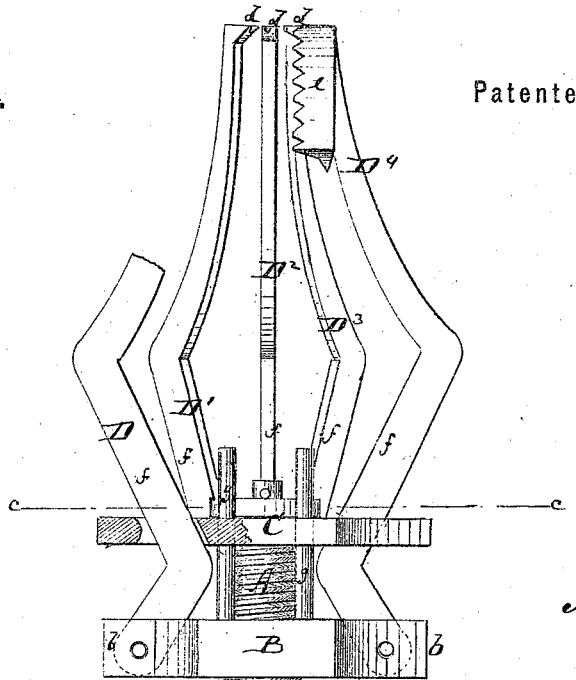

No. 118,527

UNITED STATES PATENT OFFICE.

CHARLES LEONARD GRAVES, OF OSAGE, IOWA.

IMPROVEMENT IN SHANK AND TOE-LASTERS FOR BOOTS AND SHOES.

Specification forming part of Letters Patent No. 118,527, dated August 29, 1871.

*To all whom it may concern:*

Be it known that I, CHARLES LEONARD GRAVES, of Osage, in the county of Mitchell and State of Iowa, have invented a new and improved Shank and Toe-Laster combined; and I do hereby declare that the following is a full, clear, and exact description thereof, which will enable others skilled in the art to make and use the same, reference being had to the accompanying drawing forming part of this specification, in which—

Figure 1 represents a side view, partly in section, of my combined shank and toe-laster. Fig. 2 is a plan or top view of the same, showing its arms expanded. Fig. 3 is a detail side view of the hooks. Fig. 4 is a transverse section of the apparatus on the line $c\ c$, Fig. 1.

Similar letters of reference indicate corresponding parts.

This invention relates to a new implement for stretching the toes and shanks of uppers over the last preparatory to the application of the sole. The invention consists in the combination of parts whereby I form a simple, easily-operated tool, designed for use by workmen in holding and stretching the leather in the desired manner.

A in the drawing represents a screw of suitable extent. B is the nut in which it works, and C a plate above the nut wherein the upper end of the screw is swiveled. The lower end of the screw is provided with a handle, $a$. To ears $b\ b$, projecting from the edge of the nut, are pivoted five, more or less, levers, D, $D^1$, $D^2$, &c., which extend through slots in the plate C, and carry inwardly-projecting hooks $d$ at their ends. The levers are all arranged in a semicircle, as shown in Figs. 2 and 4, so that the extremes D and $D^4$ are diametrically opposite each other. These two extreme levers D $D^4$ are also provided with projecting arms $e$ that have serrated edges, as shown. Those portions of the levers which pass through the plate C are inclined outwardly, as shown at $f$ in the drawing, so that the longitudinal adjustment of said plate will cause all the levers to swing in or out simultaneously and in radial directions. $g\ g$ are guide-pins projecting from the nut B through the plate C to steady the motion of the latter.

The implement is used for stretching the toe by applying all hooks $d$ to the leather, and then turning the screw so as to contract them, and thereby properly drawing the leather over the end of the last. For stretching the shank of the boot, the machine is inclined so that the serrated arms $e$ will take hold of the leather, the hooks $d$ remaining quite free.

Having thus described my invention, I claim as new and desire to secure by Letters Patent—

The levers D $D^1$ $D^2$ $D^3$ $D^4$, provided with hooks $d$ and arms $e$, as specified, and pivoted to the nut B and working in slots in the plate C through the medium of the screw A, as shown and described.

CHARLES L. GRAVES.

Witnesses:
CYRUS FOREMAN,
J. B. KYNDES.